Oct. 13, 1953        A. G. WHALEY        2,655,268
EXTENSIBLE RACK
Filed Dec. 23, 1949
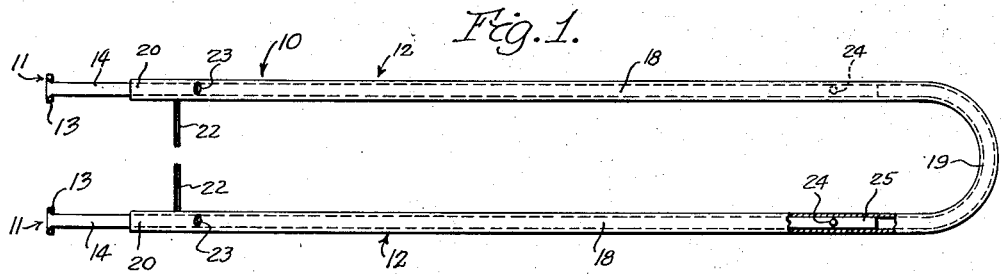
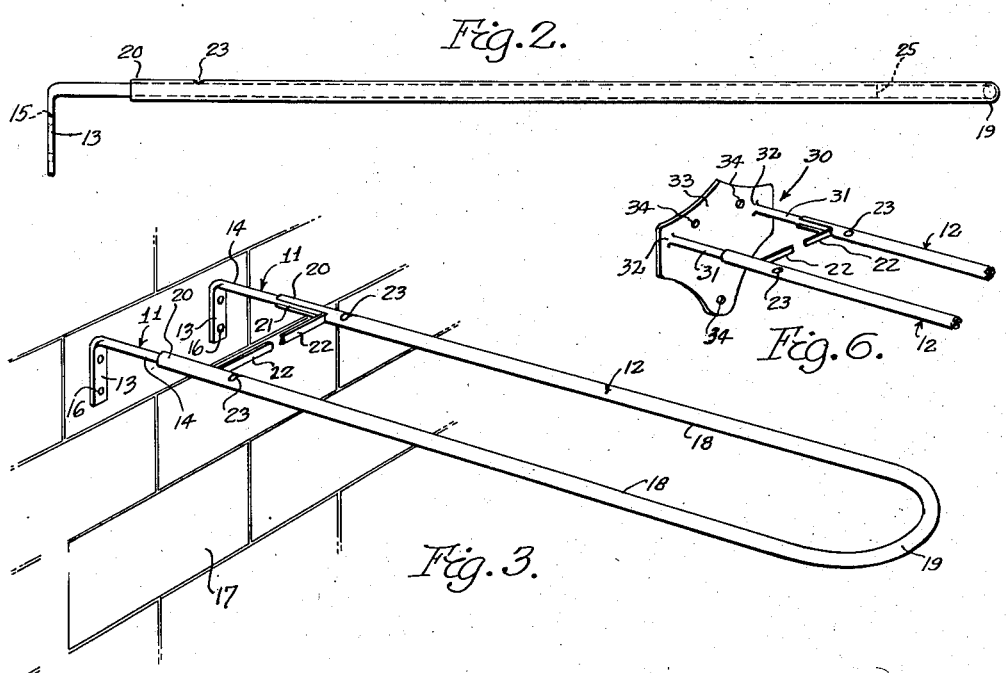
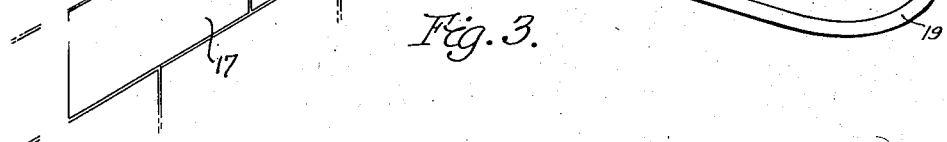
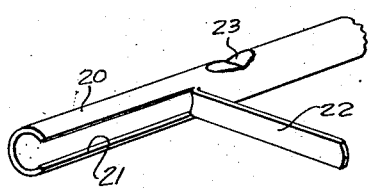
Inventor
Arthur G. Whaley
By Barthel & Bugbee
Attorneys Patented Oct. 13, 1953

2,655,268

UNITED STATES PATENT OFFICE 2,655,268

EXTENSIBLE RACK

Arthur G. Whaley, Oak Harbor, Ohio

Application December 23, 1949, Serial No. 134,673

1 Claim. (Cl. 211—87)

This invention relates to article holders and, in particular, to racks such as towel racks.

One object of this invention is to provide an extensible rack for towels or similar articles which is easily attached to a wall or other structural surface and which can be extended or retracted by the user, as desired.

Another object is to provide an extensible rack of the foregoing character, having telescoping members, the outer member being of tubular, approximately U-shaped form which thereby provides a strong and relatively stiff construction with a light weight.

Another object is to provide an extensible rack of the foregoing character wherein one of the telescoping members forming a part of the rack is provided with transversely extending projections adapted to prevent towels or other articles from sliding off that portion of the rack.

In the drawing:

Figure 1 is a top plan view of an extensible rack, according to one form of the invention;

Figure 2 is a side elevation of the rack shown in Figure 1;

Figure 3 is a perspective view of the rack shown in Figures 1 and 2 as attached to the wall of a bathroom, kitchen or the like;

Figure 4 is an enlarged fragmentary side elevation, partly in section, of the ends of one of the arms of the telescoping rack in its fully extended position;

Figure 5 is an enlarged fragmentary perspective view of the end of the tubular telescoping rack member shown in Figure 4; and Figure 6 is a fragmentary perspective view of the inner portion of a modified extensible rack.

Referring to the drawings in detail, Figures 1 to 5 inclusive show an extensible rack device, generally designated 10, according to one form of the invention as consisting generally of inner and outer telescoping bracket and rack members 11 and 12 respectively. There are two inner telescoping bracket members 11, each consisting of a rod, preferably of circular cross-section, with a flattened and broadened end 13 bent downwardly at right angles to the horizontal portion 14 of the rod 11 and provided with holes 15 for the insertion of fasteners 16 by which the rack 10 is secured to a wall 17 or other suitable structural surface. The ends 13 together form a wall attachment structure, as shown in Figure 3. The inner telescoping bracket members 11 are spaced apart from one another by a distance substantially equal to the width of the outer telescoping rack member 12, which is in a U-shaped tubular form with side arms 18 and a bridge or connecting portion 19. The free end portions 20 of the side arms 18 are slotted as at 21 and the tongue 22 thus provided is bent inwardly at right angles to the arm 18. The tongues 22 are bent toward one another (Figures 1 and 3) so that they effectively prevent towels or other articles from sliding off the tubular portion or outer telescoping member 12. After assembly of the inner telescoping members 11 within the arms 18 of the outer telescoping member 12, the end portions 20 slightly beyond the slots 21 are indented as at 23 in order to prevent withdrawal of the inner telescoping members 11. The latter are in the form of solid rods, and have projections 24 struck up out of their end portions 25. These end portion projections 24 engage the indentations 23 and prevent separation of the outer and inner telescoping members 11 and 12.

The modified extensible rack device, generally designated 30 shown in Figure 6, is generally similar to the form of the invention shown in Figures 1 to 5 inclusive, particularly as regards the U-shaped outer telescoping member 12, and similar parts are therefore designated with the same reference numerals. In this modification, however, the inner telescoping members 31 are straight rather than L-shaped as in the case of the inner telescoping members 11. Moreover, the members 31 are welded or otherwise secured at their ends 32 to a base plate or attachment plate 33 of any suitable outline forming a wall attachment structure and having holes 34 therein for receiving fasteners by which the rack is attached to the wall.

The operation of the invention is self-evident from a glance at Figure 3. The inner telescoping members 11 or 31 are attached to the wall by suitable fasteners passed through their respective apertures 16 or 34, whereupon the rack is ready for use. The rack may be left in the retracted position shown in Figure 3 or it may be pulled outward to be more accessible or to accommodate more towels, as desired. When the outer tubular member 12 is thus drawn out to its fullest extent, the projections 24 on the end portions 25 of the inner telescoping members 11 or 31 are prevented from being separated from the outer tubular members 12 by engagement with the indentations 23 (Figure 4). When the rack is in use, the tongues 22 prevent towels or other articles from sliding off the outer tubular member 12 onto the inner members 11 or 31.

What I claim is:

An extensible rack device comprising a bracket including a wall attachment structure and a pair of laterally-spaced elongated bracket members secured at their inner ends to said wall attachment structure and disposed substantially perpendicularly thereto, and an elongated substantially rigid one-piece U-shaped rack member having elongated laterally-spaced arms telescopingly engaging said elongated bracket members and slidably extensible relatively thereto, said U-shaped rack member having an arcuate bridge portion interconnecting said arms and integral therewith, one of said members being tubular and overlying the other member, the inner end portions of the arms of said U-shaped member having integral article-retaining fingers secured perpendicularly thereto and disposed substantially in the plane of said U-shaped member, said fingers projecting from said arms toward one another, the length of said U-shaped member being a plurality of times the width thereof measured between said arms.

ARTHUR G. WHALEY.

References Cited in the file of this patent

UNITED STATES PATENTS

| Number | Name | Date |
| --- | --- | --- |
| 893,232 | Forth | July 14, 1908 |
| 922,008 | Marko | May 18, 1909 |
| 924,291 | Swann | June 8, 1909 |
| 951,832 | McMahon | Mar. 15, 1910 |
| 995,982 | Moore et al. | June 20, 1911 |
| 1,042,262 | Pelletier | Oct. 22, 1912 |
| 1,391,590 | Wood | Sept. 20, 1921 |
| 2,217,188 | Snyder | Oct. 8, 1940 |
| 2,284,967 | Ray et al. | June 2, 1942 |